A. COPONY.

CONSTRUCTION FOR LOADING AUTOMOBILES IN FREIGHT CARS.

APPLICATION FILED JUNE 22, 1917.

Reissued July 31, 1917.

14,335.

2 SHEETS—SHEET 1.

Inventor
Alfred Copony

By Whittemore Hulbert & Whittemore

Attorneys

A. COPONY.
CONSTRUCTION FOR LOADING AUTOMOBILES IN FREIGHT CARS.
APPLICATION FILED JUNE 22, 1917.
Reissued July 31, 1917.
14,335.
2 SHEETS—SHEET 2.
Fig. 3.
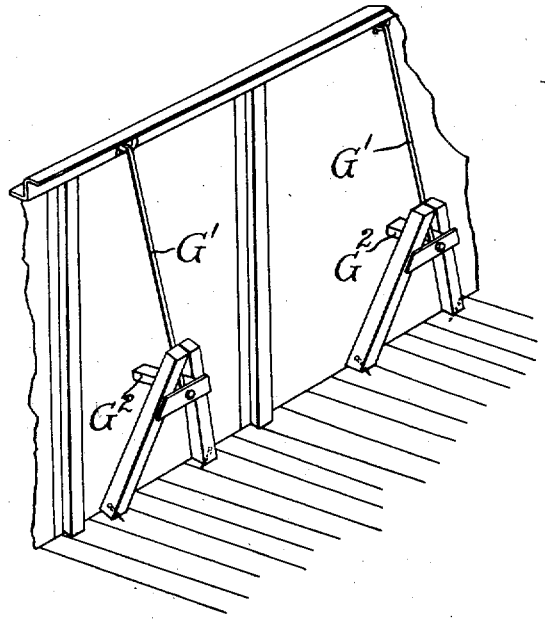
Fig. 4.
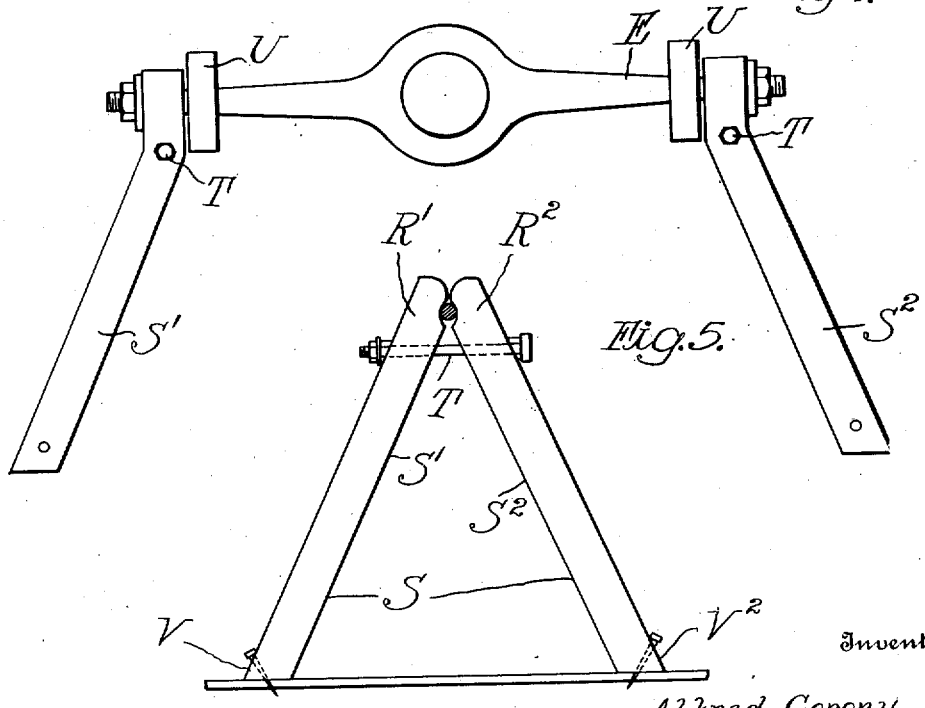
Fig. 5.
Inventor
Alfred Copony
By Whittemore Hulbert & Whittemore
Attorneys

UNITED STATES PATENT OFFICE.

ALFRED COPONY, OF DETROIT, MICHIGAN, ASSIGNOR, BY DIRECT AND MESNE ASSIGNMENTS, TO COPONY AUTO-LOADING COMPANY, A CORPORATION OF MICHIGAN.

CONSTRUCTION FOR LOADING AUTOMOBILES IN FREIGHT-CARS.

14,335. Specification of Reissued Letters Patent. Reissued July 31, 1917.

Original No. 1,186,553, dated June 13, 1916, Serial No. 90,086, filed April 10, 1916. Application for reissue filed June 22, 1917. Serial No. 176,438.

*To all whom it may concern:*

Be it known that I, ALFRED COPONY, a subject of the Emperor of Austria, residing at Detroit, in the county of Wayne and State of Michigan, have invented certain new and useful Improvements in Construction for Loading Automobiles in Freight-Cars, of which the following is a specification, reference being had herein to the accompanying drawings.

This invention relates to automobile freight cars and refers more particularly to a new and improved construction for loading automobiles in freight cars, the automobiles being placed one above another.

The salient objects of the invention are to provide a construction whereby two tiers of automobiles can be conveniently located in cars having such a small clearance that the present methods of loading will only permit one layer of automobiles to be loaded therein; to provide a simple and rigid construction in which the suspension elements for the automobiles are rigidly braced by triangular braces in two or more planes; to provide a construction in which the triangular bracing above referred to can be utilized and the apex of at least one of the triangles changed in position so as to adjust the automobile upward; to provide means for making this adjustment after the automobile is in place upon the suspension means, thus allowing a block and tackle to be used for raising the automobile toward the car roof and permitting the automobile to be lowered sufficiently to give clearance in removing the block and tackle; to provide means for suspending automobiles in either metal or wooden cars and in general to provide an improved and simplified construction of the character referred to.

The invention further resides in such features of construction and arrangements and combinations of parts as will more fully hereinafter appear.

In the drawings:

Fig. 3 is a fragmentary perspective view showing a slightly modified construction of suspension member;

Fig. 4 is an end elevation of a still further modification;

Fig. 5 is a transverse view of the supporting member shown in Fig. 4.

Figure 1:
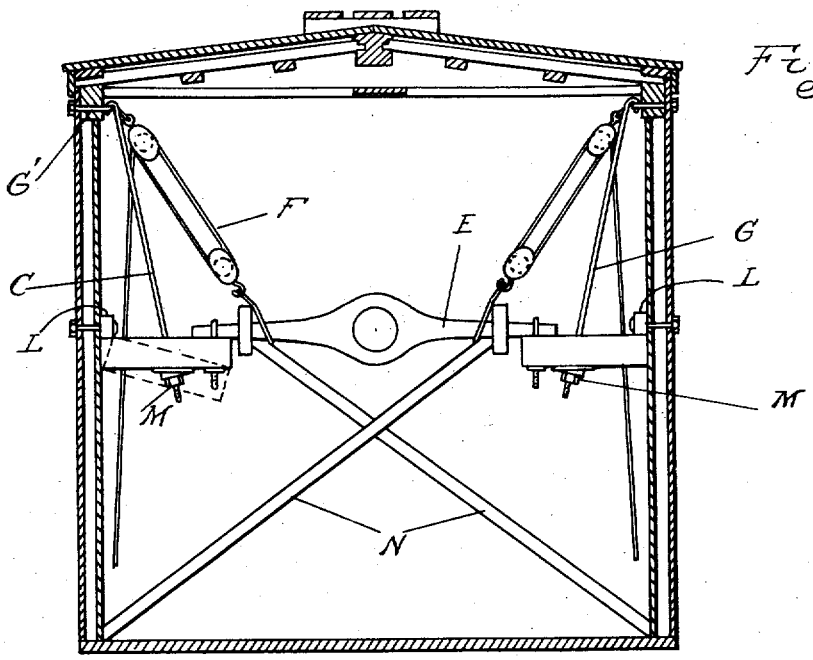
Figure 1 is a cross section showing the manner of suspending the automobile.
Figure 2:
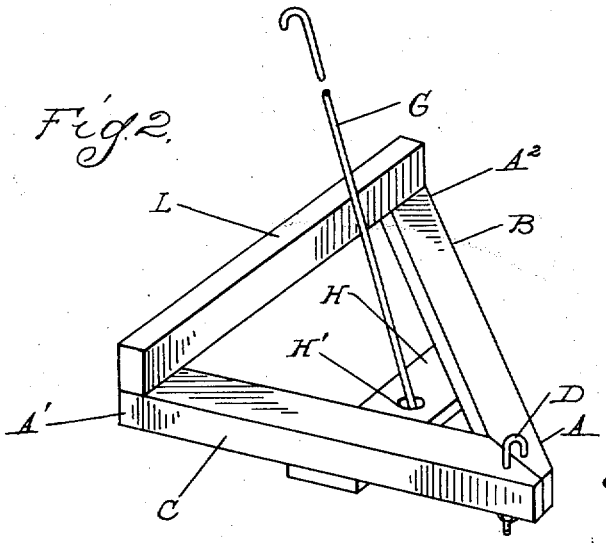
Fig. 2 is a perspective view of one of the suspension members shown in Fig. 1.

In loading automobiles in freight cars having a relatively small clearance, difficulty has been encountered in getting more than one layer of automobiles into the freight car. Where the automobiles are raised by a block and tackle it is customary to permit the automobile to drop back a sufficient amount to permit the removal of the block and tackle. The present invention contemplates an arrangement whereby the automobile after being lowered to permit of the removal of the block and tackle can be adjusted upward toward the roof so as to permit of a second automobile being placed beneath the suspended one. In suspending the automobile it is necessary to provide very rigid support and one that is properly braced. In the construction shown in Figs. 1 and 2 I have employed a novel arrangement wherein a triangular suspension member A having sides B and C is provided with a U bolt D adapted to be clamped over the axle E of the automobile. There is of course a pair of these suspension members for both the front and rear axles of the automobiles. The block and tackle arrangement F is employed for raising the automobile up toward the roof of the freight car and when so positioned the suspension members are attached as follows. The upper ends of the rods G are hooked into the eye bolts G′ and the lower end of the rod extended through a hole H′ in the cross bar H of the triangular brace A.

Secured to the side wall of the freight car is a cross brace L, there being one of these cross braces for each triangular brace and the ends A′ and $A^2$ of the triangular brace extend under the brace L. The nut M is then tightened up on the rod G sufficiently to hold the triangular brace in the position shown in dotted lines in Fig. 1. In removing the block and tackle an X-shaped support N bearing against the brake band housing and resting on the floor of the car may be employed for holding the automobile temporarily. The nut M is then tightened up on the threaded end of the rod G until each of the triangular braces have been raised to the position shown in full lines in Fig. 1. The arrangement of the triangular brace and the supporting rod G which is connected to the cross bar H gives a triangular bracing effect in both vertical and horizontal planes so that the automobile when once suspended, is rigidly braced in both directions.

In the construction shown in Fig. 3 the lower ends of the main triangular brace are toe-nailed to the floor of the car and an auxiliary brace run from the head of the triangular or A-brace to the side of the car. This construction is particularly adapted for use where the side of the car is formed of steel plates which would not permit the nailing of supports for the A-braces directly to the side of the car. A rod G′ similar to the rod G is employed in this construction, and the end of the auxiliary brace $G^2$ rests against the car side. Thus the same advantages of triangular bracing in a plurality of planes and adjustment to raise the apex or supporting part of the triangle after the automobile is in position, is permitted.

In the modification shown in Figs. 4 and 5 the supporting rods are omitted and the ends R′ and $R^2$ of the sides S′ and $S^2$ of the triangular brace S form a direct connection to the axle. A transverse bolt T extends through the sides S′ and $S^2$ and can be tightened up to securely lock the ends in bracing position between the brake bands U of the automobile and a large washer V′ temporarily placed in the axle. Where this construction is employed the lower end V of one of the sides of the triangle is first toe-nailed to the floor and then the other sides shoved over toward it until the automobile is raised as far as possible toward the ceiling. The end $V^2$ of the side $S^2$ is then nailed to the floor and the nut on the bolt T tightened up so that the automobile will be securely locked from movement in either direction.

Moreover in all cases there is sufficient clearance left beneath the upper automobile to hold a second one even with cars having as small a clearance as eight and one-half feet.

While I have shown and described various embodiments of my invention it is obvious that numerous changes can be made in the details of construction without departing from the scope of my invention. I therefore do not desire to limit the latter except as specified in the appended claims.

What I claim as my invention is:—

1. The combination with a freight car, of means for suspending an automobile therein to provide clearance for a second automobile beneath the first, said means comprising a triangular brace member forming a triangular brace in both vertical and horizontal planes.

2. The combination with a freight car, of means for suspending an automobile therein, comprising a triangular brace member forming a triangular brace in both vertical and horizontal planes, and means for raising the apex of one of the triangles after the automobile is in place.

3. The combination with a freight car, of means for suspending an automobile therein, comprising a suspension member having a triangular portion, means for securing the automobile to the triangle and means for raising that portion of the triangle toward the roof of the car while the automobile is supported on the suspension member.

4. The combination with a freight car, of means for suspending an automobile therein to provide clearance for a second automobile beneath the first, said means comprising a triangular brace member and means for changing the position of the triangle to adjust the automobile toward the roof of the car.

5. The combination with a freight car, of means for suspending an automobile therein to provide clearance for a second automobile beneath the first, said means comprising a brace coöperating with the side of the car, said brace member having a portion projecting in a vertical plane and a portion projecting in a horizontal plane.

In testimony whereof I affix my signature at Detroit, Wayne county, Michigan, this 13th day of June, 1917.

ALFRED COPONY.